C. T. LYONS

Nov. 29, 1932. SHIP'S FENDER Re. 18,672

2 Sheets-Sheet 1

Original Filed July 23, 1929

Inventor

Charles T. Lyons

By Reynolds & Reynolds

Attorneys

C. T. LYONS

Nov. 29, 1932. SHIP'S FENDER Re. 18,672

2 Sheets-Sheet 2

Original Filed July 23, 1929

Inventor

Charles T. Lyons

By Reynolds & Reynolds

Attorneys

Reissued Nov. 29, 1932

Re. 18,672

UNITED STATES PATENT OFFICE

CHARLES T. LYONS, OF MEDINA, WASHINGTON, ASSIGNOR TO DURABLE MAT COMPANY, OF SEATTLE, WASHINGTON, A CORPORATION OF WASHINGTON

SHIP'S FENDER

Original No. 1,781,403, dated November 11, 1930, Serial No. 380,280, filed July 23, 1929. Application for reissue filed December 21, 1931. Serial No. 582,483.

My invention relates generally to marine fenders. Such fenders are employed in a variety of locations and ways in marine work, more especially in connection with tug boats, where they are found upon the stem, upon the stern, and along the sides of the vessels. They will also be found useful at the corners of barges, dredges, and piers, and at the sides of such bodies.

Ordinarily they are made of rope material, and being subjected to extremes of compression and chafing action, and to the destructive effects of salt water and sun, and since they are largely composed of old rope, they are not ordinarily of long life, and they progressively and rapidly lose their resilience and their ability to protect the vessels from harmful contact.

It is an object of my invention to provide a radically different type of marine fender which will have inherent resilience, long life, and which can be, and preferably is made of a heretofore waste material, which has qualities that especially adapt it for the purpose, namely, the treads and side walls, or in general the carcasses of discarded rubber tire casings.

More especially it is an object to devise a fender wherein the resilience is achieved by the resistance to compression within the plane of a disk or disks cut from rubber tire material, which occurs by reason of the securement in close face-to-face relationship of a series of such disks, rather than by the inherent resilience of the thickness of the material of which the fender is constructed, as in the case of rope fenders.

It is a further object to devise means for assembling and securing together such disks to form fenders or fender sections.

It is a further object to provide means whereby several individual sections may be combined readily into mutually resilient and sustaining fender sections constituting a compound fender.

It is a further object to provide a fender wherein the materials employed for the disks shall have maximum durability and maximum gripping action, because of the incorporation and embedding therein of the laminations of rubberized fabric normally found in tire casings.

My invention comprises the novel parts and the novel combination and arrangement thereof, as shown in the accompanying drawings, described in this specification, and as will be more particularly pointed out by the claims which terminate the same.

In the accompanying drawings I have shown fenders made in accordance with the principles of my invention, these fenders varying somewhat in their assembled shape.

Figure 1:
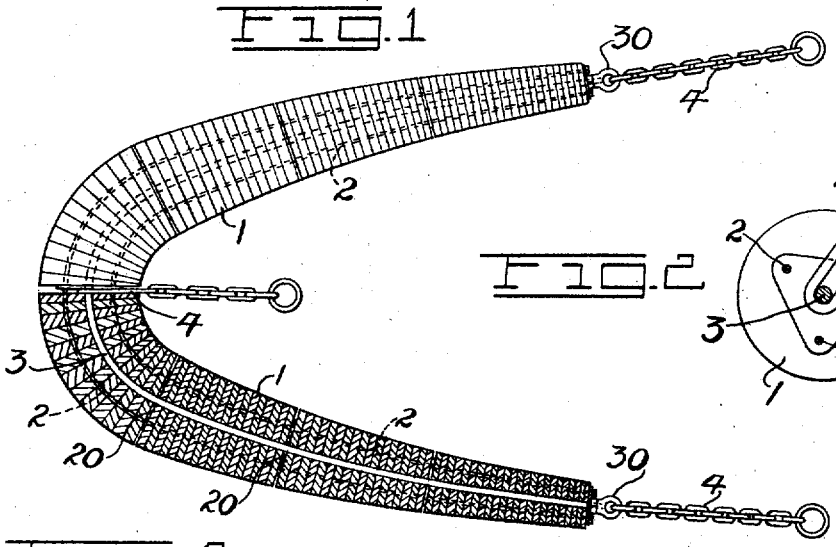
Figure 1 shows a simple form of bow fender.

The essence of my invention consists in the use of disks or plates having an inherent resiliency, and preferably also having embedded within them a form-retaining and wear-resisting cotton fabric, and a fabric which lessens the flexibility of the disks, these disks being so held together in face-to-face relationship that the flexibility of the individual disks is largely eliminated, and stresses upon opposite edges of the disks, as they are assembled, are absorbed within the plane of the several disks, whereby they are adapted for use as fenders interposed between two otherwise contacting portions of vessels which may be alongside of each other. My invention also includes certain details of construction as will be hereinafter pointed out.

I employ the term "disk" in this specification and in the claims to indicate a member having limited thickness and appreciable width and breadth. Their size may vary within the limitations of the material from which they are cut, as will be explained, and their shape may be varied to suit the position and purpose for which they are intended. They may be round, oval, elliptical, square, oblong, or strip-like, and in fact any shape desired may be used, their utility arising from the fact that though they are individually flexible to some degree, this flexibility is restrained, and they are mutually sustaining, yet their inherent resilience and compressibility is retained to the fullest when a number of disks are held together in face-to-face relationship and prevented from moving out of such relationship by some suitable means, for instance, a core passing through them.

The material which I contemplate using chiefly is automobile tire material, for this is made of a good grade of rubber, inherently resilient, and having embedded in the rubber one or many plies of fabric, the exposed edges of which prevent breaking and wearing off of the rubber, and which limits elongation of the disks and the flexibility thereof, and which lessens somewhat surface-to-surface compressibility and edge-to-edge compressibility in the plane of the disks. In addition, disks of such material possess non-slipping and gripping properties which render them superior to any material known to me and used for marine fenders. The incorporation of fabric in such material adds enormously to the life of such fenders, for the fabric holds the rubber together, and limits extremes of compression. However, I do not desire to be understood as limiting myself solely to the use of such material, for disks and other parts especially made to fill specific needs may be employed as required. Disks made from tire material may be obtained in sizes up to twenty-four inches in width, made from large truck tires, and the length may be as great as desired up to the extreme circumference of the tire employed. The size of disks used, of course, will vary with the type and size of the fender desired.

Since tire casings are not of uniform thickness throughout, such disks may vary somewhat in thickness at different points, depending upon the way in which they are cut. They may be cut, for instance, in such a way and of such size as to be thicker at one edge and thinner at the opposite edge. Such variations in thickness may be made use of, and they may be so combined in the assembled fender unit, either to neutralize the differences of thickness or to produce a fender of curved or bent shape, the thicker portions being placed on the outside of the curve.

As will now be understood, disks of the material indicated, and of a size and shape to fit the specific needs, are cut and placed in face-to-face relationship, and then means are provided for maintaining them in this relationship and for supporting them upon the vessel. As a means for holding the disks together, the several disk elements 1 may be provided with holes adapted for the reception of a binding rod or rods 2, or an equivalent member which clamps and holds the disks of a unit close together in face-to-face relationship. To further clamp them together and to support the terminal disks of a section, it is preferable to employ, at the end of each fender element, and also wherever desired at intermediate points, plates 20 of metal or other suitable material through which the binding rods pass. If circular disks are employed, it is desirable to prevent rotation of any one disk relative to the adjacent disks, and usually I will employ more than one binder rod—for instance, three rods, chains, or the like, in each fender unit.

Unless the binding means or core is inherently flexible, it or they may be bent as necessary to fit the contour of the vessel, and preferably this bending is done before assembling the disks thereon. They may, of course, be chains or cables and therefore inherently flexible, or they may be of such small size that the fender may be bent after assembly, but it is preferable to employ comparatively stout rods bent previous to assembly.

Figure 7:
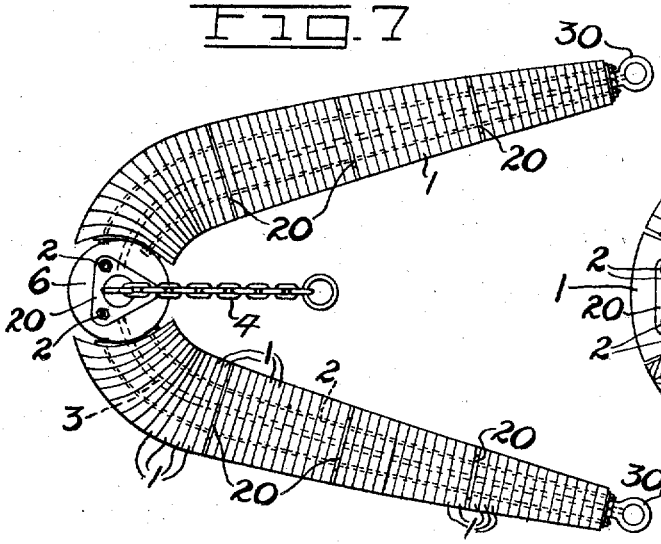
Figures 7 and 8 are plan views of bow fenders having modified constructions.
Figure 8:
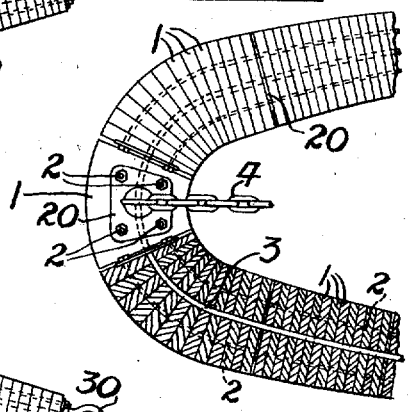

The figures show illustrative forms of fenders embodying my invention. Figures 1, 7 and 8 illustrate bow fenders. Preferably, since these would ordinarily be of considerable size, the fenders would be composed of a plurality of fender units. In this instance, to enable the complete assembling of the individual units and then their assembly upon a common core, the individual binding rods are employed in each fender section, and the disks of each section are additionally centrally apertured for the passage of a core member 3, which in this instance takes the form of a large metal rod. This core passes through the center of each fender section, holding all the sections together and serving as a means whereby the fender may be supported from the vessel—for instance, it may be provided with an eye 30, or like means, at each end, whereby lines may be attached to enable proper handling and supporting of the fender, and at the pudding a further supporting chain, as 4, connected with the central core 3, may be provided. Additional supporting devices intermediate the pudding and the ends of the wings may be provided as circumstances require.

Figure 2:
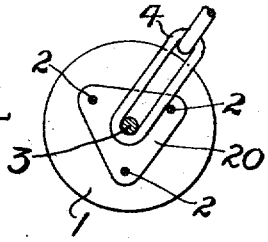
Figure 2 is a cross section of the fender of Figure 1, taken at the point of attachment of a supporting chain thereto.
Figure 4:
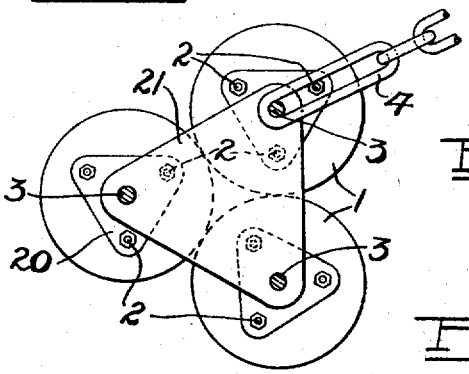
Figures 3 and 4 are similar sections of fenders in which a plurality of the simple fenders shown in Figures 1 and 2 are assembled to make a compound fender.
Figure 3:
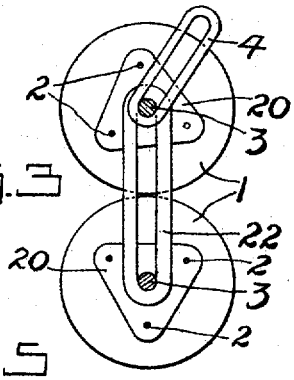

A simple form of bow fender would employ a single such construction, as has been indicated in Figure 2. However, I may employ a plurality of such assemblies as indicated in Figures 3 and 4. In order to obtain the mutual resilience of the piled up assemblies, as illustrated in Figure 4, plates 21 or open links 22, as indicated in Figure 3, may be employed to secure together the cores 3 and to permit limited movement of one section relative to the other.

Figure 5:
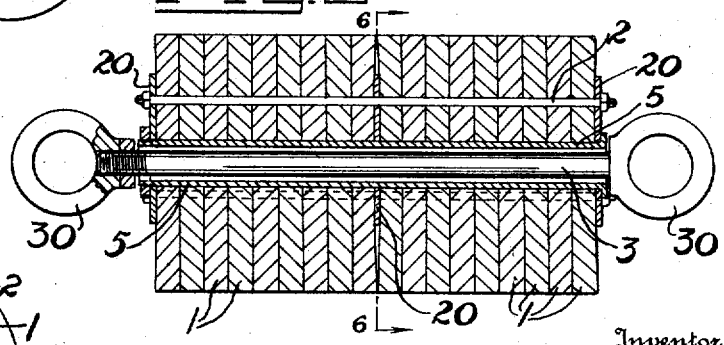
Figure 5 is a longitudinal section.
Figure 6:
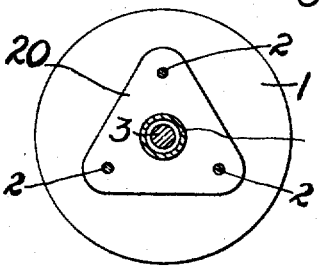
Figure 6 is a section on the line 6—6 of Figure 5, showing a side fender.

The fender shown in Figure 5 is a roller or side fender. To permit rotation of the fender relative to its core a tube 5 may be provided surrounding the rod 3 and sufficiently larger to permit free turning of the fender upon the rod. Suspending lines may be secured to the eye 30 at either end of the core 3. The tube 5 is suitably secured to the end plates 20, for instance, by having its end flanged or provided with a nut to clamp these end plates. This fender is designed to be supported against the side of a ship with its axis horizontal or between the sides of two ships with its axis vertical, so that it may roll and turn freely without twisting its suspending lines when so placed.

Figure 9:
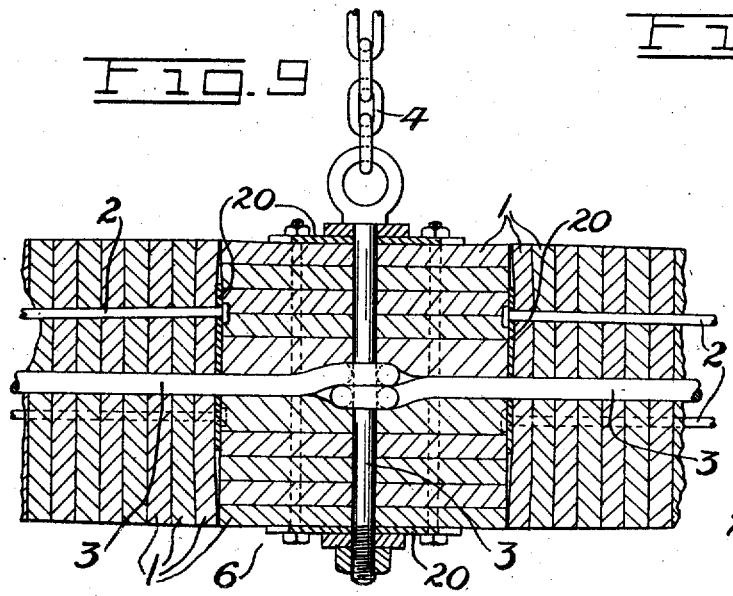
Figure 9 is a longitudinal section of the pudding of the fender of Figure 7.
Figure 10:
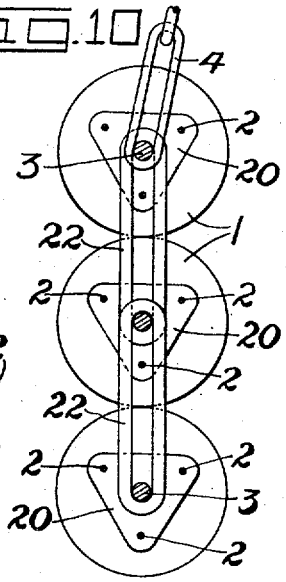
Figure 10 illustrates the assembling of a plurality of fender units in vertically disposed relation.

Figures 7, 8 and 9 illustrate a modified construction for a bow fender in which the two wings are separate from each other, and a separate pudding 6 is built up to which the wings are connected. In the pudding the disks may be made either circular, as in Figure 7, or somewhat wedge-shaped, as in Figure 8, and they are shown assembled in horizontal planes with the axis of the core 3 vertical.

In this construction certain of the disks 1, in the wings adjacent the pudding may advantageously be made and placed with a thicker edge outwardly. The natural difference in thickness between tread and side wall portions of a tire may be sufficient for this purpose, but specially molded disks may be employed if desired.

The core rod 3 of the wings may extend through the pudding to the other wing, or may be connected direct with the core rod 3 of the pudding, as shown, or the connection between the wings and pudding may be made in any other suitable manner, but preferably by rigid members which link together in some manner the cores of the wings and pudding, respectively.

In all these fenders, whether of simple form or compound form, it will be observed that the individual disks are so placed that one edge will contact with the vessel upon which they are supported, and the opposite edge will be presented to an object which is to be fended off. The disks, if they stood alone, would be so flexible, notwithstanding the embedded fabric, that they would offer but slight resistance under such pressures, but being held together in face-to-face relationship, they are mutually sustaining, and compression is absorbed within the plane of the individual disks, thus insuring the maximum resilience and thickness of rubber, yet also insuring long life. Furthermore, the individual disks, if thus presented, would flex so that the cut edge, containing the fabric, would bend over, and only rubber, which is slippery when wet, would contact. By making the disks mutually sustaining the fabric is presented to the two surfaces, and an unlooked-for gripping action occurs—so much so that a tug, thus equipped, can warp a vessel into its berth, when pushing at a quartering angle, without the use of breast or stern lines.

What I claim as my invention is:

1. A ship's fender comprising a plurality of separate plies of automobile tire casing material having fabric incorporated therein to resist compression in the plane of the ply, said plies being disposed in face-to-face relationship, and means to retain such plies closely adjacent one another to be mutually sustaining and to absorb shocks in the planes of the individual plies.

2. A ship's fender comprising a plurality of separate disk-like plies of automobile tire casing material having compression resisting fabric incorporated therein, and disposed in face-to-face relationship, means to prevent material separation or flexing of adjacent disks, whereby they are mutually sustaining and absorb pressure upon opposite edges in the plane of the individual plies, and means extending through a group of disks to support the entire group.

3. A ship's fender comprising a plurality of disks disposed in face-to-face relationship, each disk being individually flexible and resiliently compressible within limits in its own plane, and having compression resisting fabric embedded therein, and means securing together a plurality of such disks, thereby to largely eliminate the tendency of individual disks to flex, and causing them to absorb pressure upon opposite sides by yielding substantially in the respective planes of the individual disks affected.

4. A ship's fender comprising a plurality of disks disposed in face-to-face relationship, each disk being of inherently resilient and flexible material, and having incorporated within it a fabric limiting extension and decreasing flexibility, whereby the disk tends to maintain itself, when unstressed, substantially in its own plane, and means holding together a plurality of such disks, thereby to mutually sustain each other against flexure, and to induce the absorption of compression in the plane of each disk, without buckling.

5. A ship's fender comprising disks cut from rubber tire casings, and means to hold together a plurality of such disks to mutually sustain each other, to absorb pressure between opposite edges in the respective planes of the individual disks.

6. A compound ship's fender comprising disks cut from rubber tire casings, means to secure together a plurality of such disks in face-to-face relationship to form a fender section, and means securing together a series of such sections to form a fender.

7. A compound ship's fender comprising disks cut from automobile tire casings, means to secure together a plurality of such disks in mutually sustaining face-to-face relationship to form fender sections, and means to secure a plurality of such sections alongside each other, presenting disks in adjoining sections in edge-to-edge relationship, to form the fender.

8. A fender composed of a plurality of sections, each section comprising disks of tire material, and an assembling core upon which said disks are strung, and rigid members extending transversely between the core of each section and the core of an adjacent section at intervals to join such sections with their disks in edge-to-edge relationship.

9. A ship's fender comprising a plurality of disks of tire material disposed in face-to-face relationship, and a plurality of spaced binding elements passing through said disks to hold them in the specified relationship.

10. A ship's fender composed of sections, each comprising a series of disks of a resilient material assembled in face-to-face relation, a plurality of binding elements passing through said disks at points outwardly of a central axis, and an assembling member passing centrally through said sections.

11. A ship's fender comprising a plurality of flat elements of resilient material disposed in parallel planes, means incorporated within each element to limit extension in all directions, but permitting limited compression and flexibility, means to hold said elements in such disposition and to prevent their buckling, and to present them edgewise between a vessel and another body to be fended off.

Signed at Seattle, King County, Washington, this 3rd day of December, 1931.

CHAS. T. LYONS.